US009374483B2

(12) United States Patent
Numata

(10) Patent No.: US 9,374,483 B2
(45) Date of Patent: Jun. 21, 2016

(54) IMAGE READING DEVICE OUTPUTTING OUTPUT IMAGE AND EXPLANATION IMAGE, AND IMAGE PROCESSING SYSTEM HAVING THE SAME

(71) Applicant: BROTHER KOGYO KABUSHIKI KAISHA, Nagoya, Aichi (JP)

(72) Inventor: Taketo Numata, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/805,917

(22) Filed: Jul. 22, 2015

(65) Prior Publication Data

US 2015/0326741 A1 Nov. 12, 2015

Related U.S. Application Data

(63) Continuation of application No. 14/526,965, filed on Oct. 29, 2014, now Pat. No. 9,219,835.

(30) Foreign Application Priority Data

Oct. 30, 2013 (JP) ................................ 2013-225709
Oct. 22, 2014 (JP) ................................ 2014-215113

(51) Int. Cl.

| | |
|---|---|
| ***H04N 1/38*** | (2006.01) |
| ***H04N 1/56*** | (2006.01) |
| ***H04N 1/60*** | (2006.01) |
| ***H04N 1/00*** | (2006.01) |
| ***H04N 1/48*** | (2006.01) |
| ***H04N 1/387*** | (2006.01) |

(52) U.S. Cl.

CPC ......... *H04N 1/0044* (2013.01); *H04N 1/00408* (2013.01); *H04N 1/00411* (2013.01); *H04N 1/00445* (2013.01); *H04N 1/00477* (2013.01); *H04N 1/00591* (2013.01); *H04N 1/00702* (2013.01); *H04N 1/00822* (2013.01); *H04N 1/00824* (2013.01); *H04N 1/38* (2013.01); *H04N 1/3877* (2013.01); *H04N 1/48* (2013.01); *H04N 1/60* (2013.01); *H04N 2201/0081* (2013.01)

(58) Field of Classification Search

None
See application file for complete search history.

(56) References Cited

U.S. PATENT DOCUMENTS 6,249,361 B1 6/2001 Tahara
8,139,276 B2 3/2012 Uotani et al.

(Continued)

FOREIGN PATENT DOCUMENTS

JP 2010-050522 A 3/2010

OTHER PUBLICATIONS

United States Office Action dated Apr. 28, 2015 received in related U.S. Appl. No. 14/526,965.

(Continued)

*Primary Examiner* — Scott A Rogers
(74) *Attorney, Agent, or Firm* — Scully, Scott, Murphy & Presser, PC

(57) ABSTRACT

A reading device includes a reading unit, an output unit, and a processor. The processor is configured to: control the reading unit to read an image from an original sheet; perform an image process on the read image; and output, to the display, both an output image and an explanation image representing contents of the image process performed on the read image. The output image represents one of the read image and an image resulting from the image process performed on the read image.

17 Claims, 12 Drawing Sheets

(56) References Cited

U.S. PATENT DOCUMENTS

| | | | |
|---|---|---|---|
| 2007/0070442 | A1 | 3/2007 | Ohkubo |
| 2007/0216973 | A1 | 9/2007 | Tagawa |
| 2009/0322774 | A1 | 12/2009 | Hosoi et al. |
| 2012/0140278 | A1 | 6/2012 | Sousa et al. |

OTHER PUBLICATIONS

The Notice of Allowance dated Aug. 18, 2015 from related U.S. Appl. No. 14/526,965.

| PAGE NUMBER | ROTATION FLAG | BASE COLOR MODIFICATION FLAG | BLANK SHEET REMOVAL FLAG |
|---|---|---|---|
| 1 | OFF | OFF | OFF |
| 2 | OFF | OFF | OFF |
| 3 | ON | OFF | OFF |
| 4 | ON | OFF | OFF |
| 5 | OFF | OFF | ON |
| 6 | ON | ON | OFF |
| ⋮ | ⋮ | ⋮ | ⋮ |
| 10 | OFF | ON | ON |

32

| TYPE OF FLAG | ADDRESS |
|---|---|
| BLANK SHEET REMOVAL FLAG | 0X0001 |
| ROTATION FLAG | 0X1001 |

IMAGE READING DEVICE OUTPUTTING OUTPUT IMAGE AND EXPLANATION IMAGE, AND IMAGE PROCESSING SYSTEM HAVING THE SAME

CROSS REFERENCE TO RELATED APPLICATION

This application is a continuation of U.S. Ser. No. 14/526,965, filed Oct. 29, 2014, which claims priorities from Japanese Patent Application No. 2013-225709 filed Oct. 30, 2013 and Japanese Patent Application No. 2014-215113 filed Oct. 22, 2014. The entire contents of the priority applications are incorporated herein by reference.

TECHNICAL FIELD

The present invention relates to technology for outputting images read from original sheets to an output portion.

BACKGROUND

A Reading device disclosed in Japanese Patent Application Publication No. 2010-50522 uses a reading unit to read images on original sheets conveyed by for example an automatic document feeder (ADF), and displays previews of these read images on a display panel.

SUMMARY

There are some reading devices which automatically perform image process such as correction process on the read images. It is conceivable that these sorts of devices displays, on the display, images on which image process was performed. However, even if these images are displayed on the display, it is difficult for a user to ascertain what kinds of image process were performed on the original read image.

The present specification discloses technology which enables a user to ascertain a content of the image process which has been performed on read images via the output portion such as the display.

In order to attain the above and other objects, the invention provides a reading device. The reading device may include a reading unit, a display; and a processor, The processor may be configured to: control the reading unit to read an image from an original sheet; perform an image process on the read image; and output, to the display, both an output image and an explanation image representing contents of the image process performed on the read image. The output image may represent one of the read image and an image resulting from the image process performed on the read image.

According to another aspect, the present invention provides an image processing system including a reading device and an image processing device. The reading device may include a reading unit, a first interface, a first processor. The first processor may be configured to: control the reading unit to read an image from an original sheet; perform an image process on the read image; and control the first interface to transmit both an output image and an explanation image representing contents of the image process performed on the read image. The output image may represent one of the read image and an image resulting from the image process performed on the read image. The image processing device may include a second interface, a display, and a second processor. The second processor may be configured to: control the second interface to receive both the output image and the explanation image transmitted from the first interface; and display both the received output image and the received explanation image on the display.

BRIEF DESCRIPTION OF THE DRAWINGS

The particular features and advantages of the invention as well as other objects will become apparent from the following description taken in connection with the accompanying drawings, in which:

FIG. 3 is an explanation diagram illustrating an image-process table according to the embodiment;

DETAILED DESCRIPTION

A scanner 1 according to an embodiment of the present invention will be described with reference to FIGS. 1 to 12. In the following description, the left side of FIG. 1 is referred to as a front side (F) of the scanner 1; the near side of the paper surface of FIG. 1 is referred to as a right side (R) of the scanner 1; and the upper side of FIG. 1 is referred to as an upper side (U) of the scanner 1.

Figure 1:
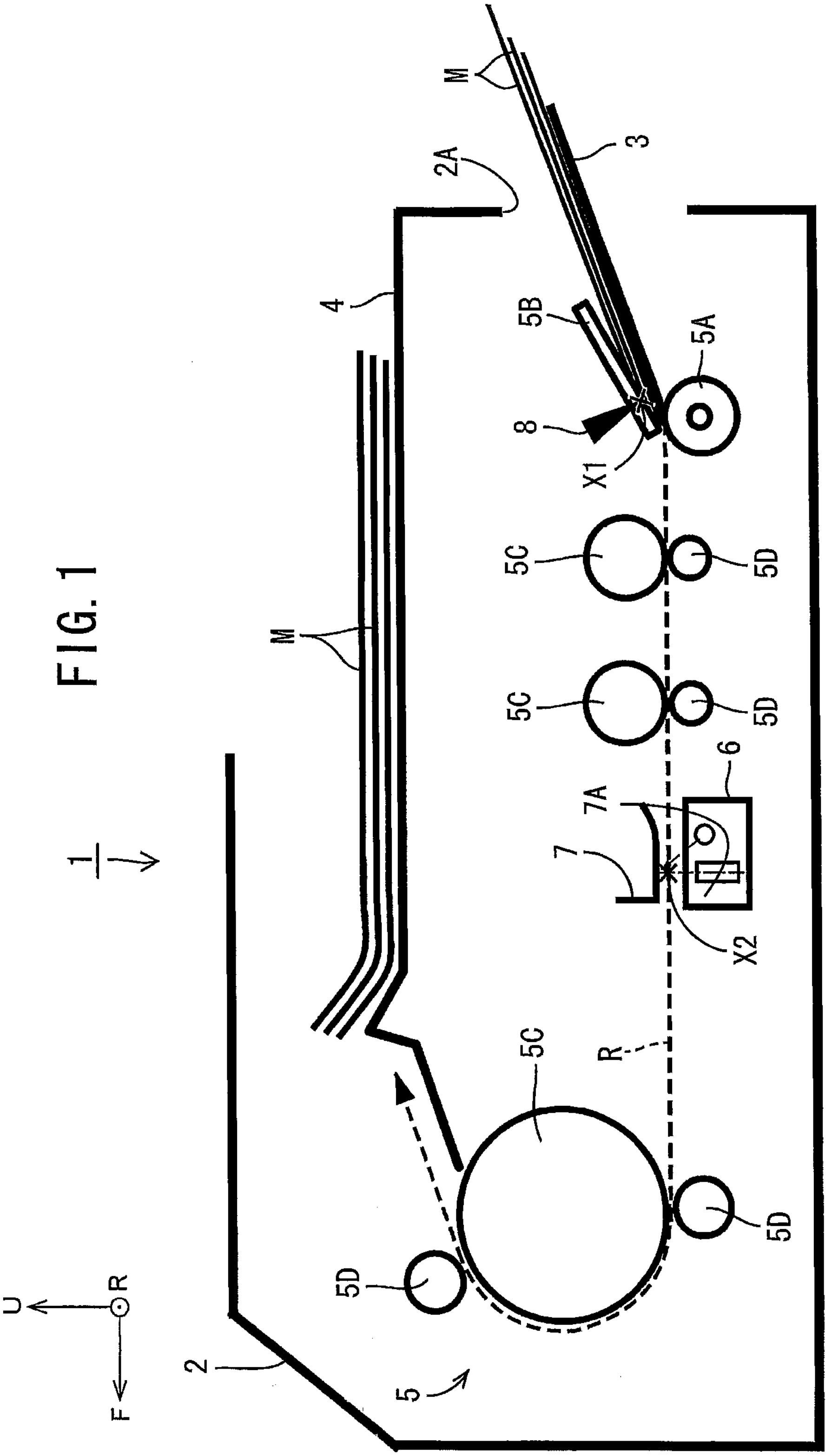
FIG. 1 is a schematic view of a mechanical structure of a scanner according an embodiment of the invention.

As shown in FIG. 1, the scanner 1 includes a case 2, a sheet tray 3, a discharged-sheet tray 4, an automatic document feeding device (referred to as "ADF," hereinafter) 5, an image reading unit 6, a sheet holding member 7, and a front sensor 8.

More specifically, the case 2 includes a rear wall in which an opening section 2A is formed. The sheet tray 3 is provided to extend through the opening section 2A. One or a plurality of original sheets M of a document or an original can be placed on the sheet tray 3 in either a portrait orientation or a landscape orientation. In case of the portrait orientation, a long side of the original sheet M is directed to a conveying direction of the ADF 5, that is, in the sub-scanning direction of the image reading unit 6. In case of the landscape orientation, the long side of the original sheet M is directed in a direction perpendicular to the conveying direction of the ADF 5, that is, in a main scanning direction of the image reading unit 6. Incidentally, the original sheets M may be made of paper or plastic.

The front sensor 8 is provided on a front end portion of the sheet tray 3. The front sensor 8 is a sheet sensor configured to detect whether or not a sheet M exists at a detection position X1 on the sheet tray 3. The detection position X1 is set on the front end portion of the sheet tray 3. The front sensor 8 is configured to transmit the detection results described later. The discharged-sheet tray 4 is provided on an upper surface of the case 2. One or a plurality of original sheets M are discharged onto the discharged-sheet tray 4.

The ADF 5 is an example of a conveyer portion and is configured to separate one sheet after another from the plurality of original sheets M stacked on the sheet tray 3, and to convey the original sheets M along a conveyance path R one by one, and to sequentially discharge the original sheets M onto the discharged-sheet tray 4. More specifically, the ADF 5 includes a separation roller 5A, a separation pad 5B, a plurality of conveying rollers 5C, and a plurality of driven rollers 5D, a guide unit (not shown) for guiding the sheet M, and a drive motor (not shown).

The separation roller 5A and the conveying rollers 5C are driven to rotate by the drive motor, and the driven rollers 5D are pressed against and driven by the conveying rollers 5C. Accordingly, the separation roller 5A and the separation pad 5B separate one sheet after another from the sheets M on the sheet tray 3, and transfer the sheet M into the conveyance path R. The conveying rollers 5C convey the separated sheet M along the conveyance path R so as to make a U-shape turn, and discharge the sheet M onto the discharged-sheet tray 4.

The image reading unit 6 is a reading device having a CIS (Contact Image Sensor). The image reading unit 6 is configured to sequentially read a line image extending in a main scanning direction (left-right direction) perpendicular to the conveying direction from a sheet that is present at a reading position X2 in the conveyance path R. The image reading unit 6 is further configured to acquire a set of data that includes a row of pixels and that corresponds to each line image (referred to as line data, hereinafter) and to transmit the line data. Incidentally, the image reading unit 6 may include a CCD (Charge Coupled Drive Image Sensor) or the like, instead of the CIS.

The sheet holding member 7 is an example of a confronting member, and is disposed to face the image reading unit 6 across the conveyance path R. The sheet holding member 7 has an opposing surface 7A facing the image reading unit 6. The opposing surface 7A has a ground color which is different from that of the sheet M. For example, the color of the opposing surface 7A is gray. Incidentally, the opposing surface 7A of the sheet holding member 7 may not be gray, and instead may be in other colors.

Figure 2:
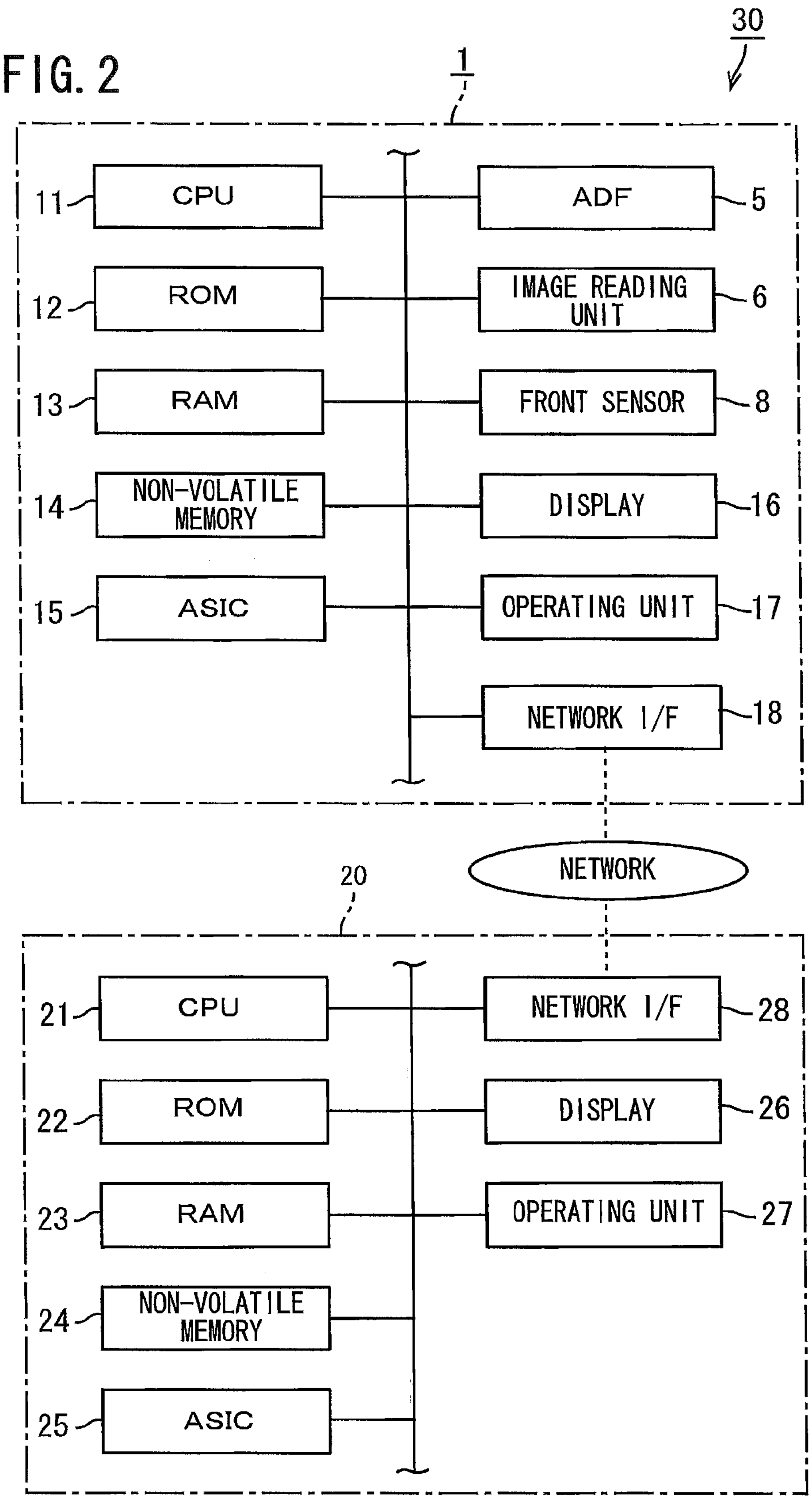
FIG. 2 is a block diagram illustrating electric structures of the scanner and a portable terminal according to the embodiment.

FIG. 2 shows an image process system 30 which includes the scanner 1 and a portable terminal 20. As shown in FIG. 2, in addition to the ADF 5, the image reading unit 6, and the front sensor 8 described above, the scanner 1 has a CPU 11, a ROM 12, a RAM 13, a non-volatile memory 14, an ASIC (Application Specific Integrated Circuit) 15, a display 16, an operating unit 17, and a network interface 18.

A various programs are stored in the ROM 12. The programs stored in the ROM 12 include, for example, programs for executing a control process described below, and programs for controlling various operations of components such as the ADF 5 and the image reading unit 6. The RAM 13 is used as a work area and as a temporary data storage area when executing the programs.

The non-volatile memory 14 stores in advance ON/OFF state flags such as a rotation flag, a base color correction flag, a blank sheet removal flag, an angle modification flag, a base color modification flag, and a blank sheet modification flag for each of read images of the original sheets M, for example. The non-volatile memory 14 further stores in advance blank sheet removal image data and blank sheet image data. In the embodiment, the non-volatile memory 14 pre-stores an image-process flag table 31 shown in FIG. 3. The rotation flag, the base color correction flag, and the blank sheet removal flag are registered in the image-process flag 31 for each of the original sheets M. In the embodiment, the page number N is assigned with each of the original sheets M according to an order in which the original sheets M are read. The values (ON or OFF state) of the rotation flag, the base color correction flag, and the blank sheet removal flag are assigned with the page number N in the non-volatile memory 14. The flags are set to the OFF state as an initial state in the embodiment when the control process (described below) starts. All of the values of the flags registered in the image-process flag table 31 may be deleted when the control process starts. In this case, values of the flags are newly recorded each time the read original sheet M is read, and initial states of the newly recorded flag are set to OFF.

Figures 4, 5:
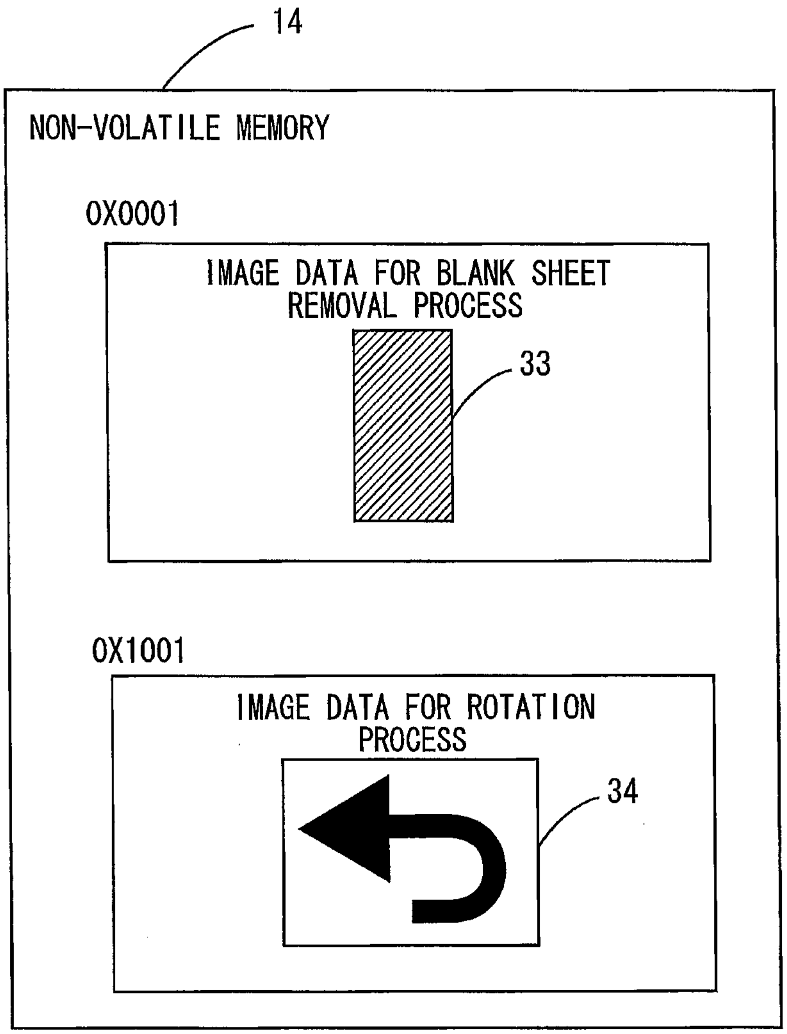
FIG. 4 is an explanation diagram illustrating an address table according to the embodiment.
FIG. 5 is an explanation diagram illustrating image data in a non-volatile memory according to the embodiment.

The non-volatile memory 14 further pre-stores an address table 32 shown in FIG. 4. The address table 32 pre-registers memory addresses of the non-volatile memory 14 corresponding to the blank sheet removal flag and the rotational flag, respectively. In the address table 32 of the embodiment, the blank sheet removal flag corresponds to the address "0X0001" and the rotation flag corresponds to the address "0X1001". As shown in FIG. 5, image data 33 and image data 34 are pre-stored at the address of the non-volatile memory 14 designated in the memory addresses in the address table 32. That is, the image data 33 used in a blank sheet removal process (described later) is stored in the address "0X0001" and the image data 34 used in a rotation process (described later) is stored in the address "0X1001". The address table 32 may be stored in the ROM 12 instead of the non-volatile memory 14. In this case, addresses in the address table 32 may designate the addresses of the non-volatile memory 14 or addresses of the ROM 12. Here, when the addresses in the address table 32 designate the addresses of the non-volatile memory 14, the image data 33 and 34 are stored in the designated addresses of the non-volatile memory 14. On the other hand, when the addresses in the address table 32 designate the addresses of the ROM 12, the image data 33 and 34 are stored in the designated addresses of the ROM 12. In other words, each address in the address table 32 identifies the location where the image data 33 or 34 is stored. The non-volatile memory 14 may be flash memory, HDD, EEPROM, or any other writable memory.

The CPU 11 is an example of a processor and a first processor. The CPU 11 is connected to the ROM 12 and the RAM 13 via a bus, and controls the components of the scanner 1 in accordance with the programs read from the ROM 12. The display 16 has a liquid crystal display and lights, and enables, for example, settings screens and operating states of devices to be displayed. The display 16 is an example of an output unit.

The operating unit 17 has buttons, and is configured to accept various input commands from a user. The operating unit 17 is an example of an receiving unit. In the present embodiment, the display 16 and the operating unit 17 constitute a touch panel, and user input commands can be accepted by a display screen 16A of the display 16. The network interface 18 is an interface for communicating with external devices (not shown) using a wired or wireless communication method. The network interface 18 is an example of a first interface.

The portable terminal 20 is, for example, a smartphone or other mobile phone, a PDA, a notebook PC, a tablet PC, a portable music playback device, or a portable video playback device. The portable terminal 20 has a CPU 21, a ROM 22, a RAM 23, a non-volatile memory 24, an ASIC 25, a display 26, an operating unit 27, and a network interface 28. The portable terminal 20 is an example of an information process device.

The ROM 22 stores various programs, such as, programs for controlling the operations of components such as the display 26. The RAM 23 is used as a work area and as a temporary data storage area when executing the programs.

The CPU 21 is an example of a second processor. The CPU 21 is connected to the ROM 22 and the RAM 23 via a bus, and controls the components of the portable terminal 20 in accordance with the programs read from the ROM 22. The display 26 has a liquid crystal display and lights, and is configured to display settings screens and device operating states, for example.

The operating unit 27 has buttons, and is configured to accept input commands from a user. The operating unit 17 is an example of an receiving unit. In the embodiment, the display 26 and the operating unit 27 constitute a touch panel, and user input commands can be received by a display screen of the display 26. The network interface 28 is an interface for communicating with external devices (not shown) using a wired or wireless communication method. The network interface 28 is an example of a second interface.

A user places one or more original sheets M on the sheet tray 3, and enters a read command through the operating unit 17. The CPU 11 then receives this read command. When the CPU 11 receives the read command and when the CPU 11 determines, based on a detection signal from the front sensor 8, that original sheets M are present on the sheet tray 3, the CPU 11 executes the control process shown in FIG. 6. This control process is configured to read an image on the original sheet M, perform image process(es) on this read image, and display on the display 16 output images includes the read image on which the image process(es) is performed, and an image which indicates the explanations of the image process(es) performed on the read image. For example, the image indicating the explanations of the image process(es) is an image indicating settings of the image process(es), or an image indicating contents of the image process(es). In the followings, a case in which a plurality of original sheets M have been placed on the sheet tray 3 will be described, as an example.

Figure 7:
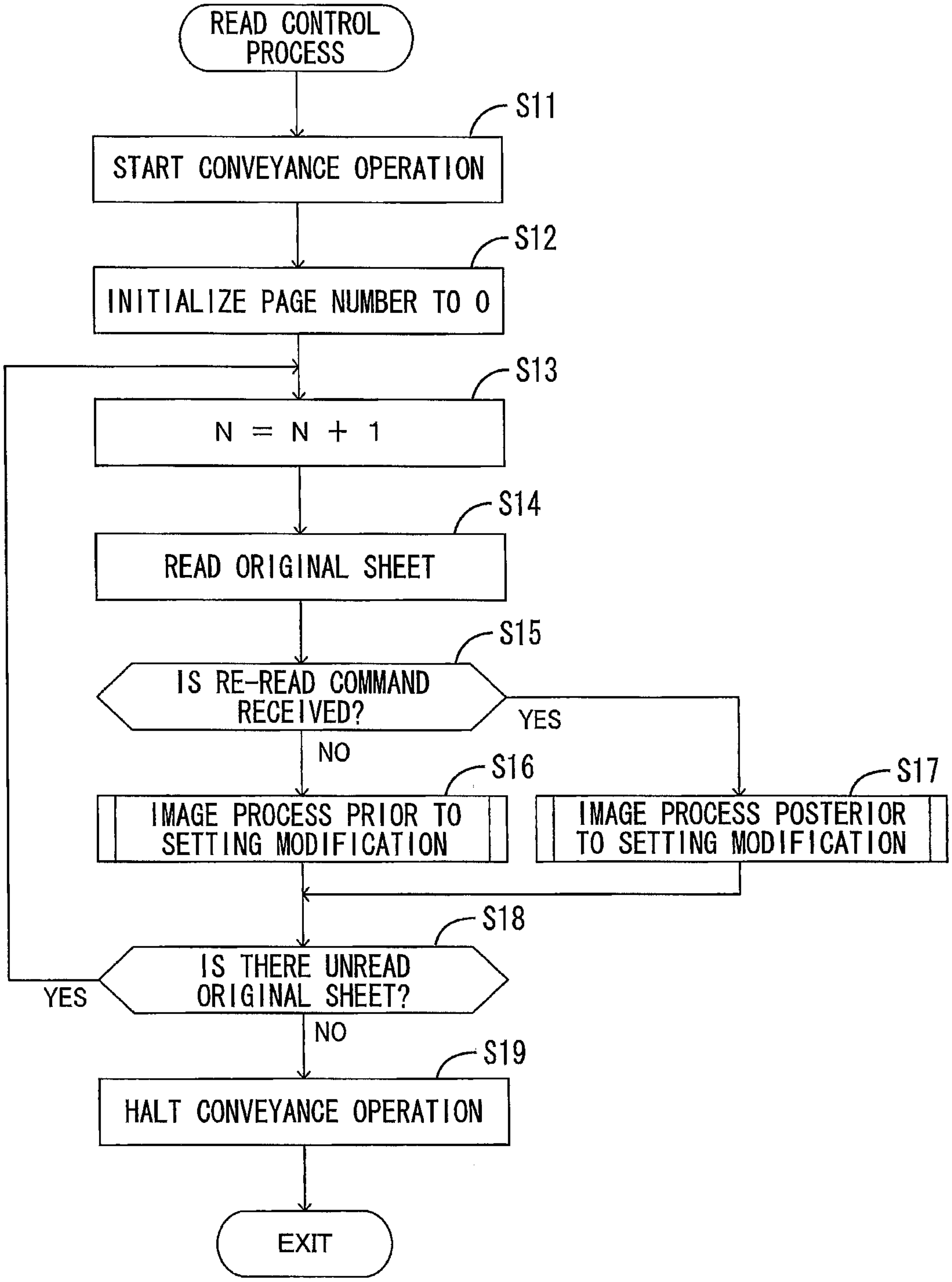
FIG. 7 is a flowchart illustrating a read control process according to the embodiment.

In S1, the CPU 11 executes a read control process shown in FIG. 7. Here, as described above, the CPU 11 initializes each flag before starting the read control process. This read control process is executed in an initial read operation, before a re-read command (described later) is instructed and a setting modification (described later) is performed. The read control process is configured to read the image on the original sheet M and perform the image processes prior to the setting modification shown in FIG. 8. This read control process is referred to as the read control process prior to the setting modification.

In the read control process, in S11 of FIG. 7 the CPU 11 controls the ADF 5 to start conveyance operation to convey one original sheet M from the sheet tray 3 on a sheet by sheet basis. In S12, the CPU 11 initializes the page number N to 0, and in S13 increments the page number N by 1.

Next, in S14, the CPU 11 controls the image reading unit 6 to read the image on the original sheet M conveyed by the ADF 5. The process in S14 is an example of read process. The conveyed original sheet M has a leading edge and a trailing edge in the conveyance direction of the ADF 5. The CPU 11 acquires read data by controlling the image reading unit 6 to execute the read operation described above starting before the leading edge of the original sheet M reaches the read position X2, and continuing until the trailing edge of the original sheet M passes across the read position X2.

After reading the image on the original sheet M, in S15 the CPU 11 determines whether or not a re-read command is instructed. As described above, this read control process prior to the setting modification is executed before the re-read command is received, so the CPU 11 determines that the re-read command is not received (S15:NO), and in S16 executes the image processes prior to the setting modification shown in FIG. 8.

This image process prior to the setting modification is configured to perform processes on the read image read by the image reading unit by using predetermined initial settings. As is described below, the image processes include a rotation process, a base color correction process, and a blank sheet removal process, and the initial settings indicates that all of these processes are executed.

In S31 of the image process prior to the setting modification, the CPU 11 determines, based on the dimensions in the main scanning direction and the sub scanning direction of the read image read in S14, whether the orientation of the read image is the portrait orientation or the landscape orientation. This read image orientation is determined by the orientation in which the original sheets M were placed on the sheet tray 3. In order to simplify the description, the size of the read image will be taken to match the size of the original sheet M that was read in S14. For example, the non-volatile memory 14 stores, as a reference value, pixel values that was preliminarily obtained when the image reading unit 6 reads the opposing surface 7A of the original document pressing member 7. Based on the image read in S14, the CPU 11 extracts, as edge pixels, pixels adjacent to pixels representing the reference value, cuts out a portion enclosed by four sides connecting locations of these edge pixels, and regards this portion as the image on the original sheet M; i.e., the read image.

In S32, the CPU 11 determines whether or not the orientation of the read image matches a prescribed orientation. Here, the prescribed orientation may be a fixed orientation specified in advance, or an orientation of a first original sheet M of the original sheets M on the sheet tray 3. In the embodiment, the prescribed orientation is set to the portrait orientation. If the CPU 11 determines that the orientation of the read image is the landscape orientation and does not match the prescribed orientation (S32:NO), in S33 the CPU 11 performs the rotation process on the read image such that the read image is rotated into the portrait orientation. Further, CPU 11 sets the rotation flag in the image-process flag table 31 corresponding to the current page number N to the ON state, and proceeds to S34. The orientation of the read image not matching the prescribed orientation is an example of an execution condition. If, on the other hand, the CPU 11 determines that the orientation of the read image is the portrait orientation and does match the prescribed orientation (S32:YES), in S33 the CPU 11 proceeds to S34 without executing the process S33.

In S34, the CPU 11 determines a base color of the read image, that is, the background color of the read image. In other words, the base color of the read image represents a ground color of the original sheet M. For example, the CPU 11 determines the base color of the read image based on the pixel values. Specifically, the CPU 11 generates histogram of color densities from all pixels of the read image or a part of the read image, determine a mode of the histogram value that is counted most frequently in the histogram, and determines the base color of the read image based on pixel values of the mode value. Next, in S35, the CPU 11 determines whether or not the determined base color matches a reference color. The reference color is white in the embodiment. The base color not matching the reference color is an example of an execution condition.

If the CPU 11 determines that the determined base color does not match the reference color (S35:NO), in S36 the CPU 11 corrects the base color of the read image to the reference color. The process in S36 is an example of base color correction process. In S37, the CPU 11 sets the base color correction flag in the image-process flag table 31 corresponding to the current page number N to the ON state, stores the pixel value representing the base color prior to correction (hereinafter referred to as pre-correction base color) in, for example, the non-volatile memory 14, and proceeds to S38. If, on the other hand, the CPU 11 determines that the determined base color does match the reference color (S35:YES), the CPU 11 proceeds to S38 without executing the processes of S36 and S37.

In S38, the CPU 11 determines whether or not the read image is a blank sheet image, in other words, whether or not the original sheet M corresponding to the read image is a blank sheet. A blank sheet image is an image the entirety of which has the same solid color. The process in S38 is an example of a blank sheet process. The read image being a blank sheet image is an example of an execution condition. For example, the CPU 11 generates a histogram concerning the density of all pixel values in the read image, determines a mode value of the histogram that is most frequently counted in the histogram, determines base color pixels that has the mode value, and determines non-base color pixels that is other than the base color pixels. Then, if the number of non-base color pixels in the part or all of the read image is less than a first reference value, the CPU 11 determines that the read image is a blank sheet image, and if the number of the non-base color pixels in the part or all of the read image is greater than or equal to the first reference value, the CPU 11 determines that the read image is not a blank sheet image. For example, the first reference value is 5% of the number of pixels in the entire read image.

The determination in S38 may be made without using the number of non-base color pixels. For example, if the ratio of base color pixels to the all pixels in the part or all of the read image is greater than or equal to a first reference ratio, the CPU 11 determines that the read image is the blank image. If the ratio of base color pixels to the all pixels in the part or all of the read image is less than the first reference ratio, the CPU 11 determines that the read image is not the blank image. The first reference ratio is 95%, for example. In order to reduce duplication of the process, the CPU 11 may determines that the number of the base color determined in S34 is the number of the pixels having the mode value.

If the CPU 11 determines that the read image is a blank image (S38:YES), in S39 the CPU 11 deletes read data for the read image determined to be a blank sheet image from entire read data of all pages, sets the blank sheet removal flag in the image-process flag table 31 corresponding to the current page number N to the ON state, ends the image process prior to the setting modification, and proceeds to S18 in FIG. 7. The process in S39 is an example of blank sheet removal process. If, on the other hand, the CPU 11 determines that the read image is not a blank image (S38: NO), the CPU 11 ends the image process prior to the setting modification, and proceeds to S18 in FIG. 7, without executing the process in S39.

In S18 in FIG. 7, the CPU 11 determines, based on a detection signal from the front sensor 8, whether or not any unread original sheets M are present on the sheet tray 3. If the CPU 11 determines that unread original sheets M are present (S18:YES), the CPU 11 returns to S13, and executes read process on the next original sheet M, with page number N+1. If, on the other hand, the CPU 11 determines that unread original sheets M are not present (S18:NO), in S19 the CPU 11 halts the conveyance operation of the ADF 5, ends this read control process, and proceeds to S2 in FIG. 6. Below, an image on which the image process prior to the setting modification has been performed will be referred to as a processed image. Incidentally, the CPU 11 stores the read data for the processed image in the non-volatile memory 14 for example, and stores a final value for page number N as a total page count MA in the non-volatile memory, for example.

Figure 6:
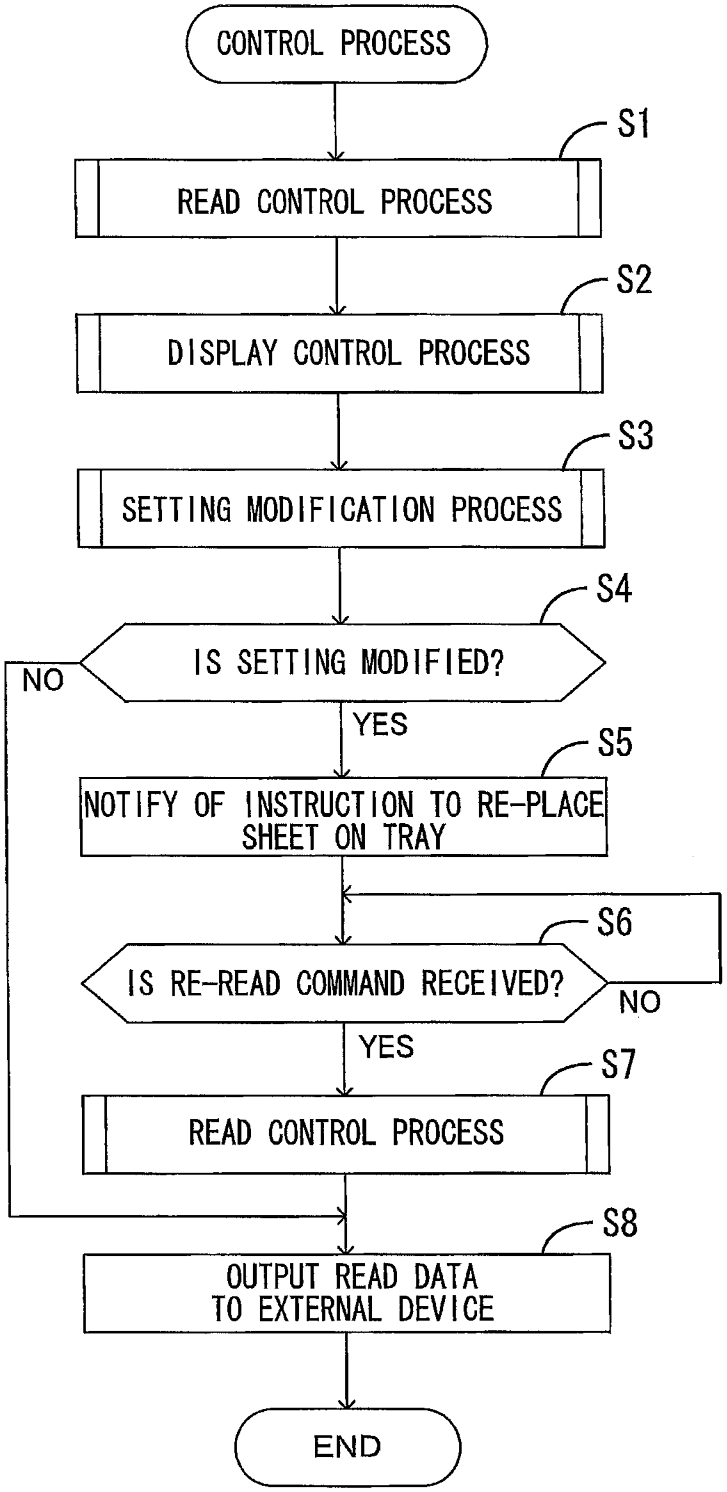
FIG. 6 is a flowchart illustrating a control process according to the embodiment.
Figure 9:
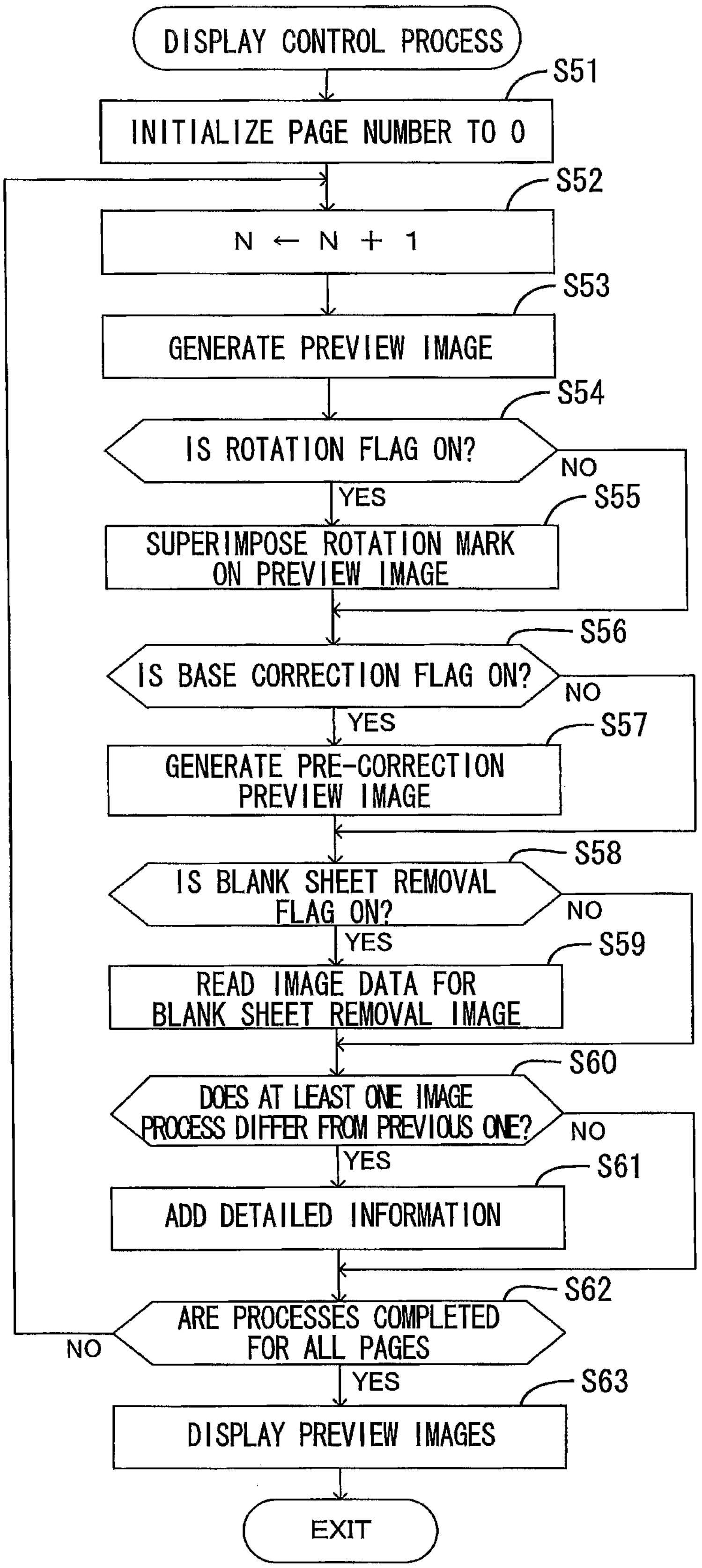
FIG. 9 is a flowchart illustrating a display control process according to the embodiment.

In S2 in FIG. 6, the CPU 11 executes a display control process shown in FIG. 9. The display control process is configured to display on the display 16 an image for output which corresponds to the processed image, as well as an image indicating the explanations (details, contents, or settings) of the image processes.

In S51 of the display control process, the CPU 11 initializes the page number N to 0, and in S52 then increments the page number N by 1. In S53, the CPU 11 copies the processed image for page number N, generates a preview image from this copied image and stores the preview image in the non-volatile memory 14. The CPU 11 generates the preview image by performing a reduction conversion in which a part of pixels are thinned out from the copied image. The preview image is an example of an output image. When the read data is deleted in S39, the CPU 11 does not generate the preview image corresponding to the deleted read image. In this case, the CPU 11 does not execute the processes S54-S57.

In S54, the CPU 11 determines, by referring to the image-process flag table 31, whether or not, the rotation flag corresponding to the page number N is in the ON state. If the CPU 11 determines that the rotation flag is in the ON state (S54: YES), in S55 the CPU 11 superimposes a rotation mark W1 (see FIG. 10) on the preview image of page number N, and proceeds to S56. Here, the rotation mark W1 is an image represented by the image data 34.

Specifically, in S55, the CPU 11 refers to the address table 32 and acquires the address "0X1001" which corresponds to the rotation flag in the address table 32. The CPU 11 acquires the image data 34 from the address "0X1001" of the non-volatile memory 14. The CPU 11 superimposes the rotation mark W1 on the preview image at a prescribed position thereof, based on the acquired image data 34. Here, the prescribed position of the preview image is a relative position from a reference position of the preview image in the embodiment. Specifically, in the embodiment, the preview image has a rectangle shape having four vertices, the reference position of the preview image is a lower right vertex of the preview image, and the relative position is a position shifted to upper left from the reference position by some pixels. The above described relative position and the reference position are just one example and not limited thereto. The CPU 11 stores, in the non-volatile memory 14, the page number N, a type of the image data (that is, data indicating that image data 34 is used or that the rotation mark W1 is displayed), and the relative position, in a relevant way. As described later, the preview image together with the rotation mark W1 displayed on the display 16 scrolls to left or right according to the user's operation. The rotation mark W is scrolled by using the relative position stored in the non-volatile memory 14. On the other hand, if the CPU 11 determines that the rotation flag is not in the ON state (S54:NO), the CPU 11 proceeds to S56 without executing the process in S55.

In S56, the CPU 11 determines, by referring to the image-process flag table 31, whether or not, the base color correction flag corresponding to the page number N is in the ON state. If the CPU 11 determines that the base color correction flag is in the ON state (S56:YES), in S57 the CPU 11 generates a pre-correction preview image. Specifically, in S57 the CPU 11 generates a copy of the preview image corresponding to the page number N, and changes the base color of the copy of the preview image into a pre-correction base color stored in S37, and stores the copy of the preview image whose base color is changed, as the pre-correction preview image. Subsequently to S57, the CPU 11 proceeds to S58. On the other hand, if the CPU 11 determines that the base color correction flag is not in the ON state (S56:NO), the CPU 11 proceeds to S58 without executing the process in S57.

In S58, the CPU 11 determines, by referring to the image-process flag table 31, whether or not, the blank sheet removal flag corresponding the page number N is in the ON state. If the CPU 11 determines that the blank sheet removal flag is in the ON state (S58:YES), in S59 the CPU 11 reads the image data 33 from the non-volatile memory 14, and proceeds to S60. The image data 33 represents the blank sheet removal image W4 shown in FIG. 10B. The blank sheet removal image W4 indicates that a read image, which has been determined to be a blank sheet image, has been removed. An image which indicates the absence of a preview image is an example of a processed image.

Figure 10A:
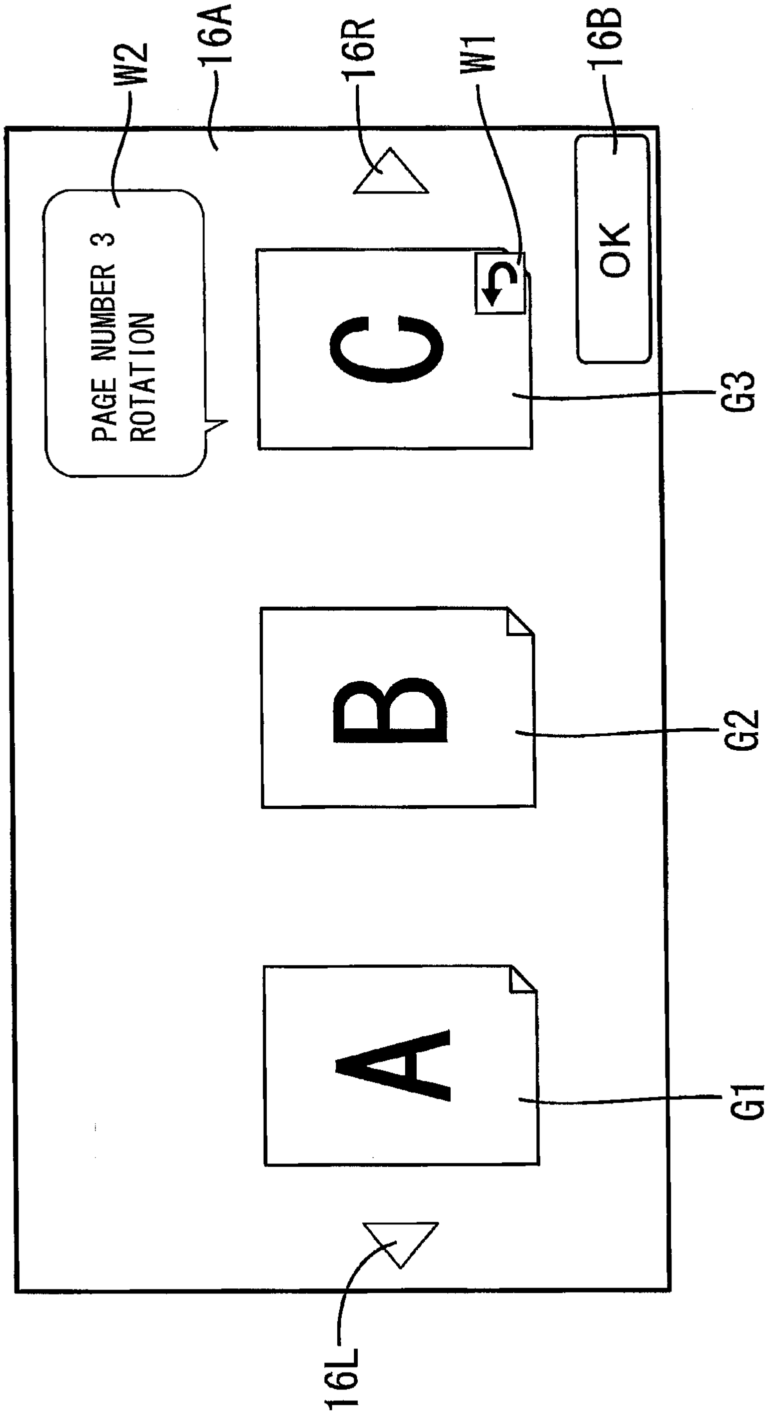
FIG. 10A is an explanation diagram illustrating a first example of preview image according to the embodiment.
Figure 10B:
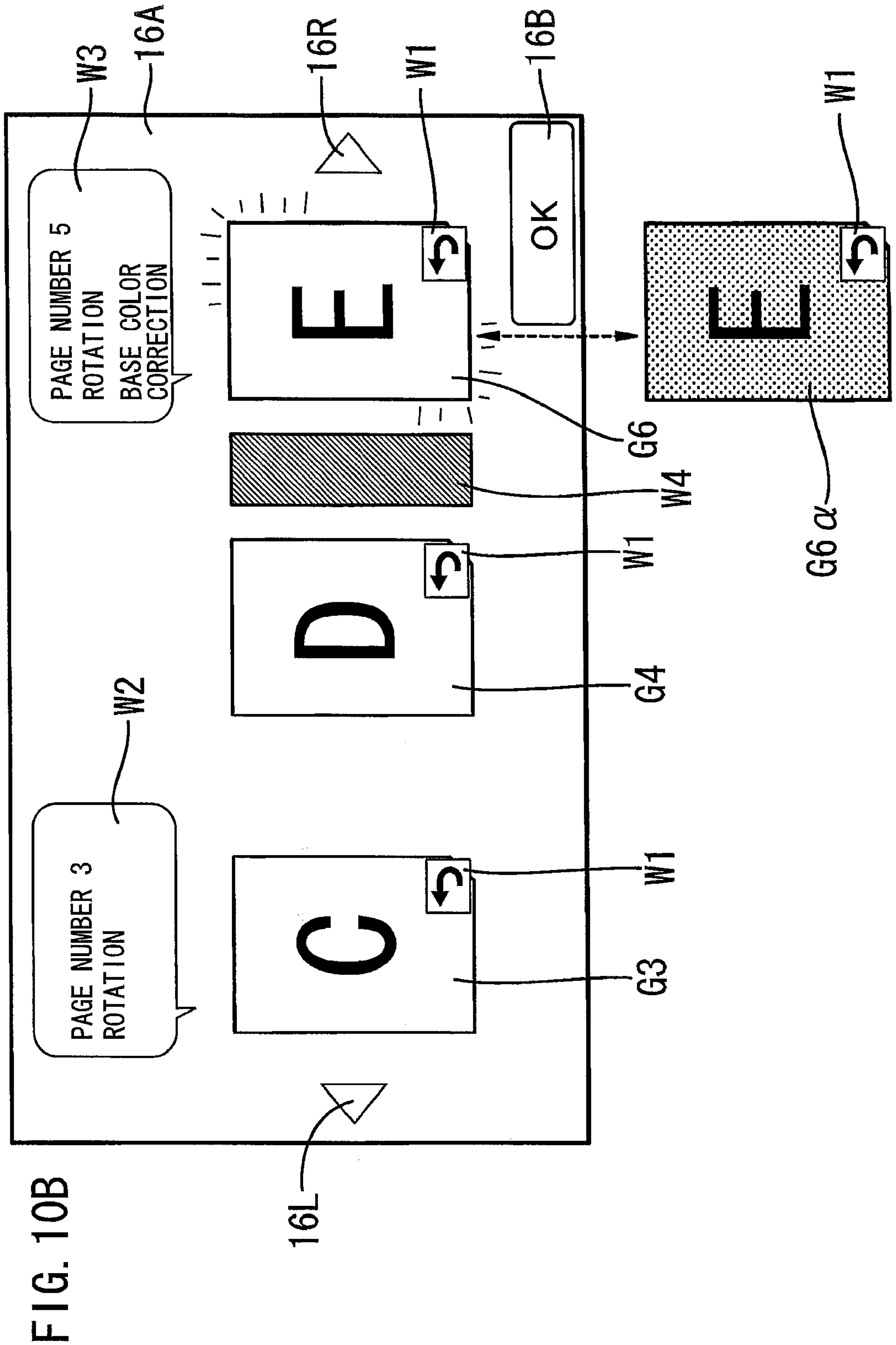
FIG. 10B is an explanation diagram illustrating a second example of preview image according to the embodiment.

Specifically, in S59 the CPU 11 refers to the address table 32, and acquires the address "0X0001" corresponding to the blank sheet removal flag in the address table 32. The CPU 11 acquires the image data 33 from the address "0X0001" of the non-volatile memory 14 and displays the blank sheet removal image W4 based on the image data 33. In the embodiment, the width of the blank sheet removal image W4 is shorter than the preview images such that the blank sheet removal image W4 can be displayed in a gap between the preview images as shown in FIG. 10B. Because the read data determined to be a blank image in S38 is deleted, the preview image cannot be generated for this read data. In the present embodiment, the blank sheet removal image W4 is displayed instead of the preview image for the deleted read data.

On the other hand, if the CPU 11 determines that the blank sheet removal flag is not in the ON state (S58:NO), the CPU 11 proceeds to S60 without executing the process in S59.

In S60, the CPU 11 determines whether or not, there is at least one of the image processes executed on the read image for the current page number N that differs from one image process executed on the read image for the previous page number N−1. The process in S60 is an example of a content determination process, and of a consecutive determination process. If the CPU 11 determines that there is at least one of the image processes for the current page N that differs from one image process for the previous page N−1 (S60:YES), in S61 the CPU 11 adds detailed information W2 or W3 regarding the image process(es) to the preview image for page number N, and proceeds to S62. As shown in FIG. 10A, this detailed information W2 and W3 describes the page number and the explanations (details) of the image process by using text. This detailed information W2 and W3 is an example of images which indicate differences in the image processes. On the other hand, if the CPU 11 determines that all of the image processes for the current page N are coincident with all of the image processes for the previous page N−1 (S60:NO), the CPU 11 proceeds to S62 without executing the process in S61. Accordingly, when all of the image processes for the successive pages are the same, the CPU 11 displays the detailed information W1 or W2 together with the preview image assigned with a smallest page number among the successive pages. However, the CPU 11 only displays the preview images except the preview image assigned with the smallest page without displaying the detailed information W1 nor W2.

In S62, the CPU 11 determines whether or not the process in S53 to S61 has been completed for all pages. Specifically, the CPU 11 determines whether or not the current page number N has reached the total page count MA described above. If the CPU 11 determines that the process of all pages has not been completed (S62:NO), the CPU 11 returns to S52 and executes the processes in S53 to S61 on the next sheet, with page number N+1. On the other hand, if the CPU 11 determines that the process of all pages has been completed (S62: YES), in S63 the CPU 11 controls the display 16 to display, in the order of the page number N, preview images for the respective pages generated by the processes in S53 to S61, and ends this display control process. The process in S63 (the display drawn in S63) is continued even after the end of the display control process. The process in S63 is an example of output process.

Here, as shown in FIGS. 10A and 10B, the display screen 16A of the display 16 is capable of displaying three pages of preview images at once. Further, the display screen 16A also displays a right arrow 16R, a left arrow 16L, and an OK button 16B. When the right arrow 16R is touched by a user, the CPU 11 controls the preview images to slide to a right side of the display screen 16A so as to display preview images having larger page numbers N than the currently displayed preview images on the display screen 16A. When the left arrow 16L is touched by a user, the CPU 11 controls the preview images to slide to a left side of the display screen 16A so as to display preview images having smaller page numbers N than the currently displayed preview images. As described above, the preview images smoothly scroll to left or right direction. When scrolling the preview images, the CPU 11 firstly reads the relative position of the rotation mark W1 from the non-volatile memory 14. Subsequently, the CPU 11 draws the preview images at shifted (slightly scrolled) positions and superimposes the rotational mark W1 on the corresponding preview image at the relative position from the reference position of the preview image. By repeatedly performing this drawing process, the rotational mark W1 is scrolled together with the preview image. Accordingly, the user can recognize information such as the rotational mark W1 on the display screen 16A without feeling of strangeness.

In FIG. 10A, preview images G1 to G3 for pages 1 to 3 are displayed with the letters A, B, and C, respectively. In FIG. 10B, preview images G3, G4, and G6 for pages 3, 4, and 6 are displayed with the letters C, D, and E, respectively. If, for example, the CPU 11 determines that the rotation flag for page 3 is in the ON state (S54:YES), the CPU 11 controls the display 16 to superimpose the rotation mark W1 on the preview image G3 of the page 3 display position on the display screen 16A, as shown in FIG. 10A. As a result, a user can easily ascertain that the rotation process has been performed on the read image for page 3.

If, for example, the CPU 11 determines that the base color correction flag for page 6 is in the ON state (S56:YES), as shown in FIG. 10B, the CPU 11 controls the display 16 to switch the preview image G6 and the preview image G6α one after another. Here, the preview image G6 is a preview image for page 6 after the base color correction is performed. The pre-correction preview image G6α is generated in S57 and indicates an image for page 6 before the base color correction is performed. Both the preview image G6 and the pre-correction preview image G6α are stored in the non-volatile memory 14 during the display control process. As a result, in comparison to configurations which do not display the pre-correction preview image G6α, a user can easily ascertain what sort of base color has been corrected. As described below, since the read image for page 5 has been removed, the preview image G6 for page 6 is displayed in the display position for page 5 (displayed in adjacent to the preview image for page 4).

If the CPU 11 determines that the blank sheet removal flag for page 5 is in the ON state (S58:YES), the CPU 11 controls the display to display the blank sheet removal image W4 at a position between the display position for page 4 and the display position for page 5. The blank sheet removal image W4 is for example a bar-shaped image which is thinner than the preview images and has a prescribed color. The blank sheet removal image W4 is an example of an image indicating that blank sheet removal process has been executed.

The preview images are arranged basically in the page order. Because the CPU 11 does not generate preview images for the removed read images determined to be a blank sheet images, the blank sheet removal images W4 are inserted to page positions of the corresponding removed read images among the arranged preview images. That is, the blank sheet removal images W4 is inserted in the arranged preview images instead of arranging preview image of the removed read image. In this way, if read images for some pages have been removed, images indicating blank sheet removal (the images W4) will be displayed on the display screen 16A in the same order of the removed read image (blank sheet image) in the arranged preview images. In other words, each image indicating blank sheet removal are displayed in the same page order of the removed read image (blank sheet image) among all pages. As a result, in comparison to configurations in which images indicating blank sheet removal are displayed in a manner that is unrelated to the page order of blank pages while remaining pages is displayed in the page order, the user can easily ascertain the positions of pages that have been removed.

If the CPU 11 determines that there is the image process for page 3 that differs from the image process for the previous page (S60:YES), the CPU 11 controls the display 16 to display the preview image G3 with the detailed information W2 regarding image process, as shown in FIGS. 10A and 10B. In addition, if the CPU 11 determines that the image process for page 4 is coincident with the image process for the previous page (S60:NO), the CPU 11 controls the display 16 to display the preview image G4 without displaying the detailed information regarding the image process, as shown in FIG. 10B. Moreover, if the CPU 11 determines that there is the image process for page 6 that differs from the image process for the previous page (S60:YES), the CPU 11 controls the display 16 to display the preview image G6 (or G6α) with the detailed information W3 regarding the image processes, as shown in FIG. 10B.

In this way, for preview images of pages having a image process that differs from those of the previous page, an image indicating that a difference in the image processes is displayed. As a result, in comparison to configurations in which images indicating differences in the image processes are not displayed, page positions at which the image process is changed can be distinguishable, and it is thus easy for a user to ascertain a position from which pages the image process is changed.

In addition, with respect to the preview image G3, the preview image G4 is simplified to the extent that the detailed information W2 is not added. In this way, from among consecutive pages with the same detailed information, images indicating explanations of the image processes are simplified for the display images for some pages than for the display images for other pages. As a result, in comparison to configurations in which images indicating explanations of the image processes for all consecutive pages are displayed, the repetitive display of detailed information can be suppressed.

If the image process is not performed on any of the pages due to failure to satisfy the execution conditions described above, an image indicating that there has been no image process may be displayed on the display screen 16A. The image indicating that there has been no image process, for example, a message indicating that there has been no image process. As a result, a user can easily ascertain that the image process has not been performed.

Figure 11:
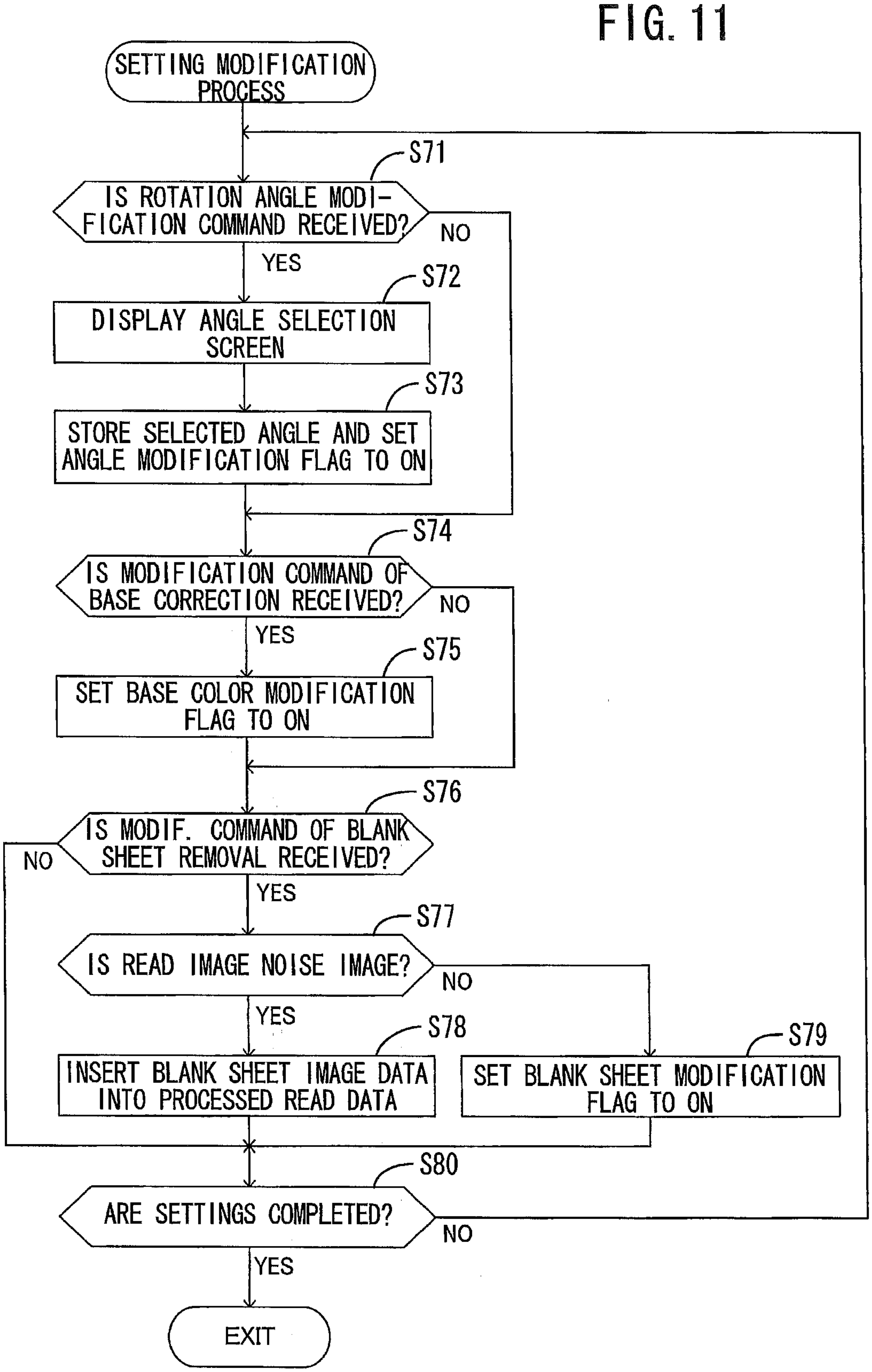
FIG. 11 is a flowchart illustrating a setting modification process according to the embodiment.

Upon ending the display control process, the CPU 11 proceeds to S3 in FIG. 6, and executes setting modification process shown in FIG. 11. The setting modification process receives modification commands for modifying the image process from a user, while preview images are being displayed on the display screen 16A. This setting modification process is an example of a receiving process.

In S71 of the setting modification process, the CPU 11 determines whether or not a rotation angle modification command has been received. For example, when the CPU 11 detects that the user touches a rotation mark W1 superimposed on a preview image on the display screen 16A, the CPU 11 determines that the rotation angle modification command has been received for the page number corresponding to the touched preview image.

If the CPU 11 determines that a rotation angle modification command has been received (S71:YES), in S72 the CPU 11 controls the display screen 16A to display, in a pop-up, an angle selection screen displaying the options of rotating left 90 degrees, rotating right 90 degrees, and rotating 180 degrees. Upon accepting one of the above options on the angle selection screen, in S73 the CPU 11 stores the selected angle in, for example, the non-volatile memory 14, sets the angle modification flag described above to the ON state, and proceeds to S74.

On the other hand, if the CPU 11 determines that a rotation angle modification command has not been received (S71: NO), the CPU 11 proceeds to S74 without executing the process in S72 and S73. Instead of the processes S72 and S74, the CPU 11 may rotate a preview image to rotate 90 degrees each time the corresponding rotation mark W1 is touched by the user, and may store the rotation angle after each touch as the selected angle.

In S74, the CPU 11 determines whether or not a modification command to prohibit the base color correction has been received. For example, when the CPU 11 detects that the user touches a preview image whose base color has been corrected, the CPU 11 determines that the modification command to prohibit the base color correction has been received. If the CPU 11 determines that the modification command to prohibit the base color correction has been received (S74: YES), in S75 the CPU 11 sets the base color modification flag which is stored in, for example, the non-volatile memory 14 to the ON state, and proceeds to S76. On the other hand, if the CPU 11 determines that the command to prohibit the base color correction has not been received (S74:NO), the CPU 11 proceeds to S76 without executing the process in S75.

In S76, the CPU 11 determines whether or not a modification command to prohibit the blank sheet removal has been received. For example, when the CPU 11 detects that the user touches a blank sheet removal image W4 described above on the display screen 16A, the CPU 11 determines that the modification command to prohibit the blank sheet removal has been received for the page number correlated to the blank sheet removal image W4. If the CPU 11 determines that the modification command to prohibit the blank sheet removal has been received (S76:YES), in S77 the CPU 11 determines whether or not the read image for the page number which is correlated to the touched blank sheet removal image W4 and for which the command to prohibit the blank sheet removal is received is noise image. The process in S77 is an example of a noise determination process.

Specifically, if the number of non-base color pixels in part or all of the read image is less than the second reference value, the CPU 11 determines that the read image is a noise image. The second reference value is smaller than the first reference value (5% of the number of pixels in the entire read image). In the embodiment, the second reference value is 3% of the number of pixels in the entire read image. The determination may be made by a following method. That is, the CPU 11 may determine that the read image is a noise image if the ratio of the number of non-base color pixels to the number of pixels in part or all of the read image is greater than a noise reference ratio. The noise reference ratio is, for example, 3%. Alternatively, the CPU 11 may determine that the read image is a noise image if the ratio of base color pixels to the number of pixels in the entire read image is greater than a non-noise ratio. The non-noise ratio is greater than the first reference ratio (95% in the embodiment) described above; for example, 97%.

If the CPU 11 determines that the read image is a noise image (S77:YES), in S78 the CPU 11 inserts the blank sheet image data described above into the processed read data at the page position at which the sheet was removed. In other words, in the read images for all pages, the CPU 11 replaces the read images determined to be blank sheet images with blank sheet image data described above and deletes the read images determined to be blank sheet images. This process is an example of a replacement process. As a result, if there are no modification command of the image process other than the modification command to prohibit the blank sheet removal, a read image that had been determined to be a noise image can be restored without performing re-reading, described below, by replacing the image with a separately provided blank sheet image.

If, on the other hand, the CPU 11 determines that the read image is not a noise image (S77:NO), in S79 the CPU 11 sets the blank sheet modification flag described above to the ON state. After executing the process in S78 or S79, the CPU 11 proceeds to S80. In addition, if the CPU 11 determines that a modification command to prohibit the blank sheet removal has not been received (S76:NO), the CPU 11 proceeds to S80 without executing process in S77 to S79. In S80, the CPU 11 determines whether or not the settings have been completed. For example, when the CPU 11 detects that the user touches the OK button 16B on the display screen 16A, the CPU 11 determines that the settings have been completed.

If the CPU 11 determines that settings have not been completed (S80:NO), the CPU 11 returns to S71. On the other hand, if the CPU 11 determines that settings have been completed (S80:YES), the CPU 11 ends the setting modification process. Then, in S4 in FIG. 6, the CPU 11 determines whether or not any settings were modified during the setting modification process. If at least one of the angle modification flag, the base color modification flag, and the blank sheet modification flag, described above, is in the ON state, the CPU 11 determines that there was a setting modification. If the angle modification flag, the base color modification flag, and the blank sheet modification flag are all in the OFF state, the CPU 11 determines that there were no setting modifications. In the embodiment, each of the angle modification flag, the base color modification flag, and the blank sheet modification flag is correlated with the page number N in the non-volatile memory 14. However, these flags may be registered in the image-process flag table 31 together with the rotation flag, the base color correction flag, and the blank sheet removal flag. In other words, the image-process flag table 31 may be extended so as to register the angle modification flag, the base color modification flag, and the blank sheet modification flag. Alternatively, a new table other than the image-process flag table 31 may be prepared in the non-volatile memory 14 for registering the angle modification flag, the base color modification flag, and the blank sheet modification flag. In this case, the angle modification flag, the base color modification flag, and the blank sheet modification flag are assigned with the corresponding page number N. Or, each flag (the rotation flag, the base color correction flag, the blank sheet removal flag, the angle modification flag, the base color modification flag, and the blank sheet modification flag) may be separately stored in the non-volatile memory 14 without tables such as the image-process flag table 31. In this case each flag is separately correlated in the page number N in the non-volatile memory 14. In any cases, it is necessary that the page number N is identified for each flag in the non-volatile memory 14.

Returning to FIG. 6, if the CPU 11 determines that there were the setting modifications (S4:YES), in S5 the CPU 11 notifies the user of an instruction to place back, onto the sheet tray 3, all of the original sheets M that were discharged to the discharge tray 4. For example, the CPU 11 controls the display screen 16A to display the instruction to place the original sheets M back onto the sheet tray 3. Notification method is not limited to the above described method. For example, the CPU 11 may control a speaker (not shown) to speak a message instructing to place the original sheets M back onto the sheet tray 3.

In S6, the CPU 11 determines whether or not a re-read command has been received. For example, if the operating unit 17 receives the re-read command during or after the notification of instruction to place the original sheets M back onto the sheet tray 3, the CPU 11 determines that the re-read command has been received. The CPU 11 may determine that the re-read command has been received if the CPU 11 detects that a part of the screen which instructs to place the original sheets M back onto the sheet tray 3 has been touched by the user.

If the CPU 11 determines that the re-read command has not been received (S6:NO), the CPU 11 waits the re-read command. On the other hand, if the CPU 11 determines that the re-read command has been received (S6:YES), in S7 the CPU 11 executes the read control process shown in FIG. 6.

The read control process in S7 is executed when a re-read command has been received. The read control process reads the image on the original sheet M and performs the image processes on this read image posterior to the setting modification shown in FIG. 12. A description is presented below of only process which differs from the image process prior to the setting modification in FIG. 8, described above.

Figure 12:
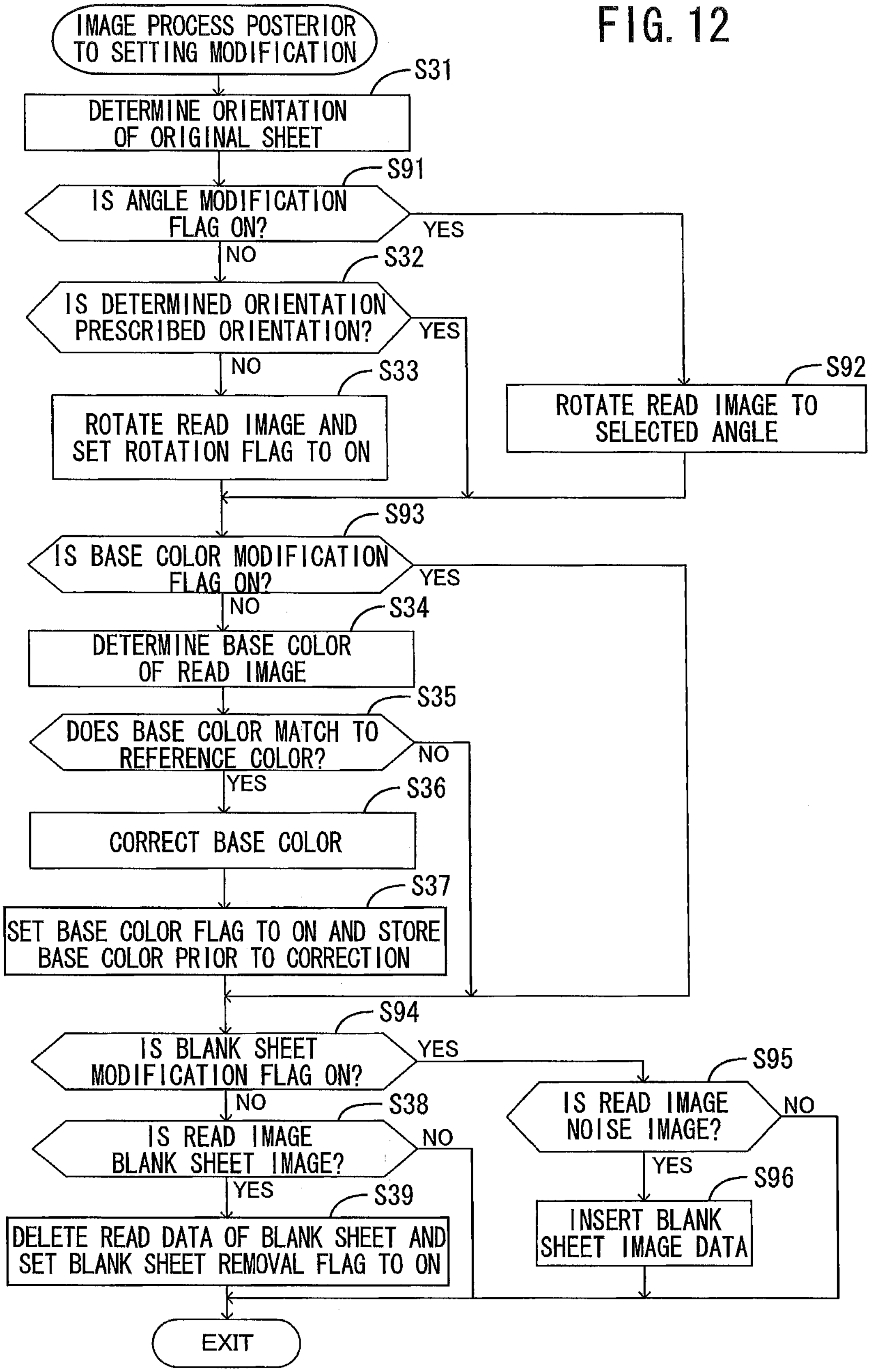
FIG. 12 is a flowchart illustrating an image process posterior to setting modification according to the embodiment.

As described above, this read control process posterior to the setting modification is started upon receipt of the re-read command from a user, so the CPU 11 determines that there was a re-read command (S15:YES) and in S17 executes the image process posterior to the setting modification shown in FIG. 12.

(4-1) Image Process Posterior to the Setting Modification

The image process posterior to the setting modification (S17) performs the modified image process on the read image upon receipt of the re-read command (S15: YES) after the modification command is received. Below, for process that is the same as that for the image process prior to the setting modification in FIG. 8, the same reference numerals are designated to avoid duplicating description.

After determining the orientation of the read image in S31, in S91 of FIG. 12 the CPU 11 determines whether or not the angle modification flag is in the ON state. If the CPU 11 determines that the angle modification flag is not in the ON state (S91:NO), the CPU 11 executes the processes in S32 and S33, described above, and proceeds to S93. On the other hand, if the CPU 11 determines that the angle modification flag is in the ON state (S91:YES), in S92 the CPU 11 rotates the read image to the selected angle which had been stored in S73, and proceeds to S93. Because the user instructs to change the rotation angle while viewing the displayed contents of the display 16, the user can obtain a desired result of the rotation angle regardless of the prescribed orientation when the re-read is performed.

In S93, the CPU 11 determines whether or not the base color modification flag is in the ON state. If the CPU 11 determines that the base color modification flag is not in the ON state (S93:NO), the CPU 11 executes the process in S34 to S37, described above, and proceeds to S94. On the other hand, the CPU 11 determines that the base color modification flag is in the ON state (S94:YES), the CPU 11 proceeds to S94 without executing processes S34-S37. In other words, the CPU 11 does not perform the base color correction on the read image.

In S94, the CPU 11 determines whether or not the blank sheet modification flag is in the ON state. If the CPU 11 determines that the blank sheet modification flag is not in the ON state (S94:NO), the CPU 11 executes the process in S38 and S39, described above, and ends this image process posterior to the setting modification. On the other hand, if the CPU 11 determines that the blank sheet modification flag is in the ON state (S94:YES), in S95 the CPU 11 determines whether or not the read image is a noise image. In the process in S95, the determination results of S77 in FIG. 11 can be used.

If the CPU 11 determines that the read image is a noise image (S95:YES), in S96 the CPU 11 deletes, the read image data for page N in the read data obtained in the re-read operation, and inserts, in place of the deleted read image data, the blank sheet image data described above. In other words, the CPU 11 replaces a read image determined to be a noise image with a blank sheet image. On the other hand, if the CPU 11 determines that the read image is not a noise image, i.e. determines that the read image is a non-noise image (S95:NO), the CPU 11 prohibits the execution of blank sheet removal on this read image, which has been determined to be a non-noise image. As a result, read images which may contain valid information are retained without being removed.

If the CPU 11 has ended the image process posterior to the setting modification in FIG. 12, or has also determined that there was no settings modification (S4:NO), the CPU 11 proceeds to S8 in FIG. 6. In S8, the CPU 11 outputs the read data obtained in the read control process prior to the setting modification if there was no settings modification, or the read data from obtained in the read control process posterior to the setting modification if there was the setting modification, to an external device such as the portable terminal 20 via the network interface 18, and ends this control process.

According to the embodiment, preview images as well as images indicating the explanations of the image processes are displayed on the display 16. As a result, a user can, by viewing the display 16, easily ascertain what image process is performed on the read images.

In addition, when these preview images and other information are displayed on the display 16, modification commands to modify the image processes are received on the operating unit 17. After the re-reading operation, the modified image processes are performed on the re-read images based on these modification commands. As a result, in comparison to configurations in which image process modifications are not received while the display operation is performed, the user can easily ascertain, based on the information displayed on the display 16, details regarding the modified image processes performed on the read images after the re-reading operation will be executed.

While the invention has been described in detail with reference to the embodiment thereof, it would be apparent to those skilled in the art that various changes and modifications may be made therein without departing from the scope of the invention.

The "reading device" is not limited to the scanner 1 having only a scanning function. The reading device may be multi-function devices and facsimile devices which have multiple functions such as a copying function in addition to the scanning function. The reading device may also be configured such that the original tray is disposed upward of the discharge tray. The reading device may also be configured such that both sides of original sheets are read, that is, one and opposite surfaces of a single original sheet are read, resulting in reading images for two pages. Further, the reading device is not limited to types which read images of original sheets conveyed by the ADF 5. The reading device may include an originals platen, and read original sheets placed in stationary position on this originals platen.

The "processor" corresponds to the single CPU 11 that performs various types of processes such as the process shown in FIG. 6. However, for example, these various types of process may be executed by multiple CPUs, as the processor, these various types of process may be executed by only a special purpose hardware circuit such as the ASIC 15, or these various types of processes may be executed by a CPU and a hardware circuit.

The "image processes" are not limited to the rotation process, the base color correction process, and the like. The image process may also correct read images so as to satisfy other image conditions. The image process may also include, for example, a process that corrects color images to become monochrome images, a process that changes resolution, or a process that trims read images. The image process may include a show-through removal process. Specifically, in image drawn on one side of the sheet is visible on (show-through) other side of the sheet, especially when the sheet is thin paper, for example. In this case, when scanning the other side of the sheet, scanned image includes not only the image of the other side but also an image of the one side. The show-through removal process removes the undesired image of the one side from the scanned image.

In the "control process" in FIG. 6, after executing display control process in S2, the CPU 11 may proceed to S8 without executing the processes in S3 to S7.

Figure 8:
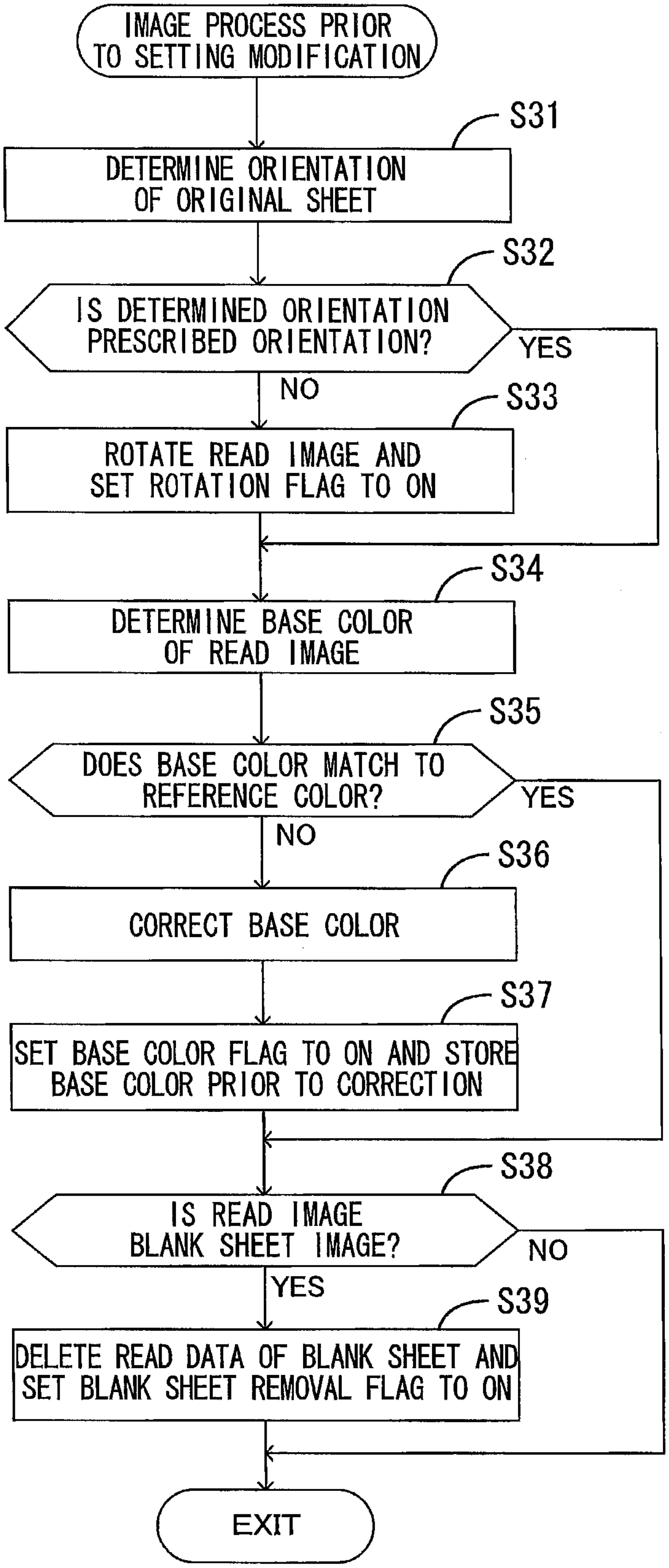
FIG. 8 is a flowchart illustrating an image process prior to setting modification according to the embodiment.

For determining the orientation of the read image in S31 in FIG. 8, various methods, including known methods, may be used instead of the method described above. For example, the CPU 11 may obtain the size of the original sheets M based on commands entered by the user on the operating unit 17, or based on a detection signal from a detection sensor detecting the size of an original sheet M (not shown), and to determine the orientation of the read image based on the size of the obtained original sheet M and on the size of the read image in the main scanning direction.

Various methods other than the methods described above may be used for determining the base color of the read image in S34 in FIG. 8, when determining blank sheets in S38 in FIG. 8, and the like. These various methods may be well-known methods.

In the "image process prior to the setting modification" in FIG. 8, the CPU 11 may not execute at least one of the processes related to orientation (S31 to S33), the processes related to base color (S34 to S37), and the processes related to blank sheets (S38 and S39), or execute these processes in a different order. In the "image process prior to the setting modification" in FIG. 8, the CPU 11 may execute the processes related to blank sheets before the processes related to base color. In that case, if the CPU 11 determines that the read image is a blank sheet image during the processes related to blank sheets, the CPU 11 may omit the processes related to base color, thereby reducing the process load.

The CPU 11 may start the display control process shown in S2 in FIG. 6 before the read control process in S1 is completed for all of the original sheets M. For example, each time the image for one original sheet M is read, the CPU 11 may execute the display control process on that read image. In the "display control process" in FIG. 9, the CPU 11 may not execute at least one of the processes related to orientation (S54 and S55), the processes related to base color (S56 and S57), and the processes related to blank sheets (S58 and S59), or may execute these processes in a different order.

In the "setting modification process" in FIG. 11, the CPU 11 may not execute at least one of the processes related to rotation (S71 to S73), the processes related to base color (S74 and S75), and the processes related to blank sheets (S76 to S79), or may execute these processes in a different order. If the CPU 11 determines that a modification command to prohibit the blank sheet removal has been received (S76:YES), the CPU 11 may proceed to S79 without executing the process in S77.

In the "image process posterior to the setting modification" in FIG. 12, the CPU 11 may not execute at least one of the processes related to angle (S91 and S92), the processes related to base color (S93, and S34 to S37), and the processes related to blank sheets (S94 to S96), or may execute these processes in a different order. If the CPU 11 determines that the blank sheet modification flag is in the ON state (S94: YES), the CPU 11 may end the image process posterior to the setting modification without executing the processes S95 and S96.

The display image is not limited to images reflecting the result of the image processes such as the preview images described in the embodiment. The display images may alternatively be images based on read images before the image process is performed. In this case, the user can recognize what image processes are performed by watching the rotation mark W1, the detailed information W2, W3, or the blank sheet removal image W4 that are displayed on the display screen 16A similarly to the embodiment. The CPU 11 may generate reduced images from the read images, and perform the image processes on the reduced images according to the flags, and use the processed reduced image as the preview image.

The "images indicating the explanations of the process" are not limited to the rotation mark W1, the detailed information W2,W3 that are marks indicating the details of the image processes. The images indicating the explanations of the process may alternatively be an image different from the display image. For example, the images indicating the explanations of the process image may be one of a display image based on the read image and a display image based on the image-processed read image that is different from the display image, such as the preview image G6 or G6α described above.

The "detailed information" need not be displayed on a steady basis. Further, the detailed information may alternatively be displayed as a pop-up in response to the preview screen having been touched by a user.

In S63 in FIG. 9, the CPU 11 may display both the preview image G6 representing an image before the base correction process is performed and the preview image G6α representing an image after the base color correction process is performed such that the images G6 and G6α are arranged side by side on the display screen 16A.

The "output unit" is not limited to the display 16, and may alternatively be a transmission unit that transmits information such as output images to an external device. Specifically, the image process system 30 in FIG. 2 may alternatively have a configuration such as the following. The CPU 11 of the scanner 1 transmits data for images indicating the preview images and the explanations of the image processes to the portable terminal 20 via the network interface 18. This process is an example of transmission process. The CPU 21 of the portable terminal 20 receives the data of the preview images and the like via the network interface 18, and displays the preview images and the like on the display 26. This process is an example of the reception process and of the display process. The CPU 11 may alternatively be configured to receive the modification commands described above via the operating unit 27, and transmit these commands to the scanner 1. Here, the operating unit 27 is an example of a receiving unit.

The "information process device" is not limited to the portable terminal 20 described above, and may alternatively be, for example, an electrical device such as a desktop PC or digital camera. Basically, the information process device may be any device which has a display and which enables, for example, output images transmitted from the scanner 1 to be displayed.

What is claimed is:

1. A reading device comprising:
a reader;
a display; and
a processor configured to:
control the reader to read an image from an original sheet;
specify characteristics of the read image by analyzing the read image;
determine whether to perform an image process on the read image on a basis of the characteristics;
perform the image process on the read image when it is determined to perform the image process on the read image on the basis of the characteristics; and
output, to the display, both an output image and an explanation image representing contents of the image process performed on the read image when the image process is performed on the read image, the output image representing one of the read image and an image resulting from the image process performed on the read image.

2. The reading device according to claim 1, wherein the image process includes a first image process and a second image process,
wherein the processor is further configured to:
determine whether to perform a first image process on the read image on the basis of the characteristics;
perform the first image process on the read image when it is determined to perform the first image process on the read image on the basis of the characteristics;
determine whether to perform a second image process on the read image on the basis of the characteristics; and perform the second image process on the read image when it is determined to perform the second image process on the read image on the basis of the characteristics, wherein the output image representing one of the read image and an image resulting from at least one of the first image process and the second image process which is performed on the read image, wherein the explanation image indicates all of the first image process and the second image process which is performed on the read image process.

3. The image reading device according to claim 1, wherein the processor is further configured to:

control the reader to read a plurality of images from a plurality of original sheets;

specify characteristics of each of the plurality of read images by analyzing the each of the plurality of read images;

determine whether to perform an image process on each of the plurality of read images on a basis of the characteristics corresponding to the each of the plurality of read images;

perform the image process on any read image on which it is determined to perform the image process;

output, to the display, a plurality of output images, each of the plurality of output images corresponding to one of the plurality of read images and representing, when the image process is performed on the one of the plurality of read images, one of: the one of the plurality of read images; and an image resulting from the image process performed on the one of the plurality of read images; and wherein the explanation image is output to the display together with one of the plurality of output images corresponding to one of the plurality of read images on which the image process is performed.

4. The image reading device according to claim 1, wherein the characteristics includes at least one of an orientation of the read image, and a base color of the read image.

5. The image reading device according to claim 1, wherein the characteristics concerns distribution of densities in the read image.

6. The image reading device according to claim 1, wherein the processor is further configured to:

control the reader to read a plurality of images from a plurality of original sheets, each of the plurality of read images being assigned with a page number; and determine whether any of the plurality of read images is a blank sheet image, wherein the image process is for removing the read image determined to be the blank sheet image and the processor outputs, to the display, one or more output images corresponding to the plurality of read images which remain unremoved, each of the one or more output images being assigned with a page number corresponding to the page number of the corresponding read image, the one or more output images being outputted in a page order of the page number to the display, wherein when a read image is removed, the processor is configured to output a removal explaining image representing that the read image is removed, the explaining image being output to a position of the page number corresponding to the removed read image among the one or more output images.

7. The image reading device according to claim 1, wherein the read image includes a base color representing a ground color of the original sheet, and the image process performed on the read image is for changing the base color of the read image to a reference color, wherein the processor is further configured to output, together with the output image representing the read image whose base color is the reference color, a comparative image representing the read image whose base color is the ground color.

8. The image process according to claim 7, further comprising a memory, wherein the processor is further configured to:

correct the base color when the reader to read an image from an original sheet;

store the ground color in the memory;

generate a copy of the output image;

change the base color of the copy of the output image into the ground color stored in the memory; and output the copy of the output image as the comparative image.

9. The image process according to claim 1, further comprising a network interface, wherein the processor is further configured to:

control the network interface to receive a modification command instructing to modify the image process; and perform a modified image process based on the modification command on the image that is read upon receipt of the modified command.

10. The image reading device according to claim 9, further comprising a memory, wherein the processor is further configured to:

determine whether the read image is a blank sheet image, wherein the image process is for removing the read image determined to be the blank sheet image, wherein the processor is further configured to control the network interface to receive a prohibiting command instructing to prohibit removing the read image, wherein when the network interface receives the prohibiting command, the processor controls the reader to read the image from the original sheet, and store the read image, as an end result, in the memory.

11. The image reading device according to claim 9, further comprising a memory, wherein the processor is further configure to:

determine that the read image is the blank sheet image when the number of non-base color pixels is smaller than a first reference value, the non-base color pixels representing color different from the base color;

determine that the read image is a noise image when the non-base color pixels in the read image is smaller than a second reference value, wherein the second reference value is smaller than the first reference value; and receive a prohibiting command instructing to prohibit removing the read image, wherein when the network interface receives the prohibiting command and when the read image is not the noise image, the processor controls the reader to read the image from the original sheet, and store the read image, as an end result, in the memory.

12. The image reading device according to claim 9, wherein the image process performed by the processor is for rotating the read image, wherein the processor is further configured to receive a rotation modification command instructing to rotate the read image a prescribed angle, wherein when the network interface receives the rotation modification command, the processor controls the reader to read the image from the original sheet and rotates the read image the prescribed angle.

13. The image reading device according to claim 1, further comprising a network interface, wherein the processor is further configure to determine that the read image is the blank sheet image when the number of non-base color pixels is smaller than a first reference value, the non-base color pixels representing color different from the base color, wherein the processor is further configured to:

receive a prohibiting command instructing to prohibit removing the read image; and determine that the read image is a noise image when the non-base color pixels in the read image is smaller than a second reference value, wherein the second reference value is smaller than the first reference value, wherein when the network interface receives the prohibiting command and when the read image is the noise image, the processor is further configured to:

control the reader to read the image from the original sheet; and change the read image to a prescribed blank sheet image.

14. The image reading device according to claim 1, wherein the processor is further configured to:

control the reader to read a plurality of images from a plurality of original sheets, each of the plurality of read images being assigned with a page number;

perform at least one of a plurality of image processes on at least one of the plurality of read images;

determine whether there is an image process that is performed on a target page of the read image among the plurality of read images and is different from an image process performed on a previous page of the target page; and output, to the display, a plurality of output images corresponding to the plurality of read images, wherein when there is the image process that is performed on the target page of the read image and is different from the image process performed on the previous page, the processor is further configured to output an explanation image indicating that there is the image process that is performed on the target page and is different from the image process performed on the previous page, together with the output image corresponding to the target page.

15. The image reading device according to claim 1, wherein the processor is further configured to:

control the reader to read a plurality of images from a plurality of original sheets, each of the plurality of read images being assigned with a page number;

perform at least one of a plurality of image processes on at least one of the plurality of read images;

determine whether all of at least one of the plurality of image processes performed on successive pages of read images is the same; and output, to the display, a plurality of output images corresponding to the plurality of read images, wherein when all of the at least one of the plurality of image processes performed on the successive pages of read images is the same, the processor is further configured to output an explanation images together with an output image corresponding to an read image assigned with a smallest page number among the successive pages, wherein the processor is configured to output read images of the successive pages except the read image assigned with the smallest page number without adding the explanation page.

16. The image reading device according to claim 1, wherein the processor performs the image process when the read image meets a prescribed condition, wherein the processor does not output the explanation image when the read image does not meet the prescribed condition.

17. An image processing system comprising a reading device and an image processing device, a reading device comprising:

a reader;

a first interface; and a first processor configured to:

control the reader to read an image from an original sheet;

specify characteristics of the read image by analyzing the read image;

determine whether to perform an image process on the read image on a basis of the characteristics;

perform the image process on the read image when it is determined to perform the image process on the read image on the basis of the characteristics; and control the first interface to transmit both an output image and an explanation image representing contents of the image process performed on the read image when the image process is performed on the read image, the output image representing one of the read image and an image resulting from the image process performed on the read image, an image processing device comprising:

a second interface;

a display; and a second processor configured to:

control the second interface to receive both the output image and the explanation image transmitted from the first interface; and display both the received output image and the received explanation image on the display.

* * * * *